Figure 1:
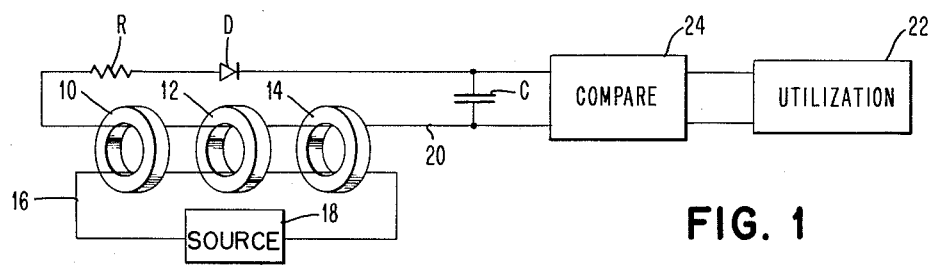

Sept. 11, 1962   W. L. SHEVEL, JR   3,054,044
TEMPERATURE SENSING CIRCUIT
Filed Dec. 30, 1959

INVENTOR
WILBERT L. SHEVEL JR.
BY
ATTORNEY

United States Patent Office 3,054,044
Patented Sept. 11, 1962

3,054,044
TEMPERATURE SENSING CIRCUIT
Wilbert L. Shevel, Jr., Poughkeepsie, N.Y., assignor to International Business Machines Corporation, New York, N.Y., a corporation of New York
Filed Dec. 30, 1959, Ser. No. 863,034
7 Claims. (Cl. 323—48)

This invention relates to temperature sensing devices and, more particularly, to a novel temperature sensing device employing a plurality of coupling elements each made of material exhibiting coupling characteristics which characteristics disappear when the material is heated to a transitional temperature.

When a body is heated, the vibrational speed of its molecules increases rapidly. This has a number of physical effects: in the case of metal, its physical characteristics change; in the case of confined gas or liquid, its pressure increases. In both cases, the temperature rises as a result of increased heat. In measuring a given temperature or temperature range, the relative change of the molecular activity is defined by a quantitative expression. An instrument measures temperature because it is sensitive to at least one of the physical effects produced by the increased molecular activity. For instance, a host of devices have heretofore employed the effects of thermoelectricity, radiation or changes of electrical resistance for metals. Such devices, however, have heretofore been relatively costly and require very stringent manufacturing techniques.

By constructing a device in accordance with this invention a novel device for measuring temperatures or temperature regions is achieved avoiding much of the above difficulties. More specifically, a plurality of elements each made of material having a coupling characteristic is employed wherein the material of the different elements has different transition temperature which, when surpassed, inhibits the coupling characteristics thereof. Such material may be of the magnetic type, as employed herein. Further the magnetic type material may be of the saturable reactor type or have remanence characteristics. As a specific embodiment of this invention, a plurality of elements, such as magnetic cores made of material capable of attaining different stable states of residual flux density, more popularly known as "rectangular loop" material, are shown wherein the materials of the different cores have a different Curie temperature. An input and an output winding is provided each coupling the different cores with the input winding adapted to be energized by different polarity impulses to alternately set and reset the cores from one stable state to another. The output signal obtained when the cores are switched depends upon the magnitude of the time and rate of flux change which takes place within the material of each core. The time rate of change in turn is dependent upon the total flux within the material, the coercive force of the material and the switching parameter of the material. When magnetic material experiences increases in temperature, a continuous decrease in flux density, coercive force, and the value of the switching parameter is experienced, which decreases to zero at the Curie temperature. This temperature effect is described in detail in a book entitled, "Ferromagnetics," by Richard M. Bozarth, published by the D. Van Nostrand Co., Inc., on pages 713–715. With each of the cores made of material exhibiting different transitional or Curie temperatures and since the flux density decreases to zero for the different cores as their Curie temperature is reached, the output signal obtained on the output winding decreases and thus provides an accurate measurement of the temperature.

Accordingly, it is a prime object of this invention to provide a novel temperature sensing device.

Another object of this invention is to provide a novel temperature sensing device employing a plurality of elements having coupling properties which property is caused to change when the material attains a predetermined transition temperature.

Still another object of this invention is to provide a novel temperature sensing device employing magnetic elements wherein the different elements are made of material exhibiting different Curie temperatures.

The foregoing and other objects, features and advantages of the invention will be apparent from the following more particular description of a preferred embodiment of the invention, as illustrated in the accompanying drawings.

Figure 2:
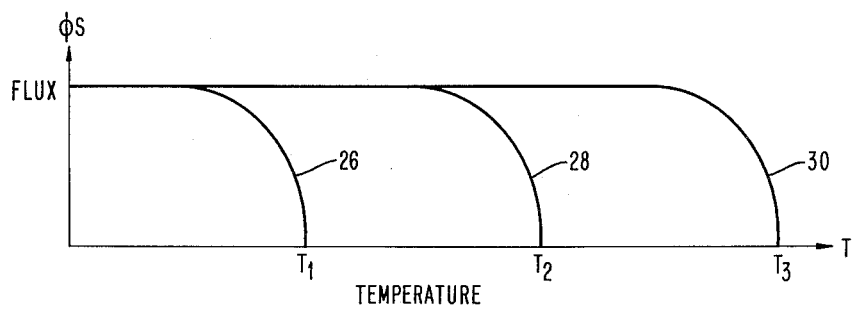
Figure 3:
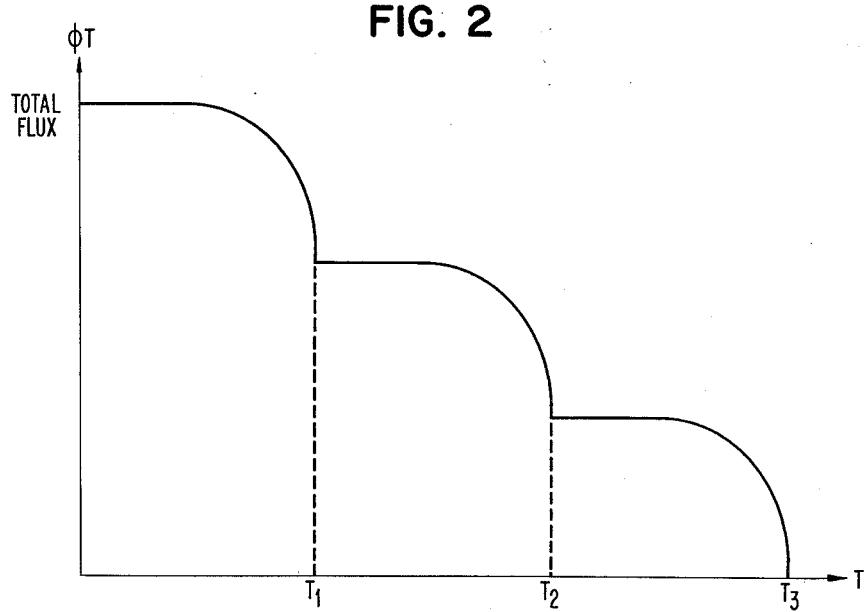

In the drawings:
FIG. 1 is a circuit of an embodiment of this invention.
FIG. 2 illustrates a plot of saturation flux versus temperature for the different cores employed in the circuit of FIG. 1.
FIG. 3 illustrates a plot of total flux versus temperature for the cores employed in the circuit of FIG. 1.

Referring to FIG. 1, an embodiment of this invention is shown wherein a plurality of magnetic cores 10, 12 and 14 are provided each made of material exhibiting coupling properties and a substantially rectangular hysteresis characteristic, more popularly known in the art as "square loop" material. The cores 10, 12 and 14 are coupled by an input winding 16 connected to a source 18 adapted to energize the input winding 16 with opposite polarity pulses capable of alternately switching the cores 10, 12 and 14 from one state of saturation to another. The cores 10, 12 and 14 are also provided with an output winding 20 coupling each of the cores. The output winding 20 is connected to a capacitor C, through a resistor R and a diode D and thence to a utilization means 22 through a comparing means 24.

Each of the cores 10, 12 and 14 while made of substantially rectangular hysteresis loop material are also made of material exhibiting different Curie temperatures. That is, the core 10 is made of material exhibiting one Curie temperature, the core 12 is made of material exhibiting another Curie temperature while the core 14 is made of material exhibiting still another Curie temperature. Referring to FIG. 2, a plot of saturation flux density ($\phi$S) versus temperature T is shown wherein a curve 26 describes the saturation flux density for the material of core 10, a curve 28 describes the saturation flux density for the material of core 12, while a curve 30 describes the saturation flux density for the material of core 14. As may be seen with reference to the curves 26, 28 and 30, with increasing temperature the total flux retentivity of the material of core 10 vanishes at a temperature $T_1$ while that of core 12 vanishes at a temperature $T_2$ and that of core 14 at a temperature $T_3$, where $T_1 < T_2 < T_3$. Thus the different temperatures $T_1$, $T_2$ and $T_3$ describe the Curie temperature for each of the respective materials of the cores 10, 12 and 14.

Referring now to FIG. 3, a plot of total flux ($\phi$T) versus temperature T is shown wherein the vertical plot describes the sum total of flux of all the cores 10, 12 and 14. With increases in temperature the total flux retained in the cores 10, 12 and 14 is seen to be substantially constant over a lower range of temperatures and then undergoes a decrease until the temperature $T_1$ is reached. After the temperature $T_1$ is reached, the total flux is seen to again remain constant but of a lower relative magnitude for another range of temperature and then abruptly decreases until the temperature $T_2$ is reached. Thereafter, the total flux again remains constant, but of a smaller relative magnitude, for another range of temperature until $T_3$ is reached where the curve meets the horizontal coordinate describing zero flux. The corelation between the curves of FIG. 2 with the curve of FIG. 3 is manifest.

Referring again to the circuit of FIG. 1, when the source 18 energizes the input winding 16 coupling each of the cores 10, 12 and 14, with an impulse of a given polarity, each of the cores is established in a datum stable state of residual flux density. As the cores 10, 12 and 14 are switched to the datum stable state, a voltage is induced in the output winding 20 which causes a current to flow therein. This current is blocked and its energy dissipated by the high back resistance of the diode D. If, sometime thereafter, the source 18 energizes the input winding 16 with a current impulse of opposite polarity which switches each of the cores 10, 12 and 14 to an opposite state of saturation a voltage which is now induced on the output winding 20 due to the flux change within each of the cores is integrated by means of the condenser C. The charge provided to the condenser C is then a function of the total saturation flux of each of the cores 10, 12 and 14, which is a function of temperature as shown in the FIG. 3. Thus the integrated output voltage induced on the output winding 20 at this time is a direct measurement of the temperature range which the cores are at within this time. The integrated output is then applied to the comparing means 24, upon discharge of the capacitor C, which compares this output against a fixed signal representing a predetermined temperature, or temperature range. Depending upon the function desired, that is, whether it is desired to maintain a given system above, below or within a given range of temperatures, a signal is transmitted to the utilization means which may take the form of an alarm or correcting means.

The specific circuit for the means 24 is not shown, since such circuits are well known and may be designed for the different type operation or function desired, as described above and is not necessary for an understanding of this invention.

It should be understood, as pointed out above, that while the embodiment of FIG. 1 has been constructed employing rectangular loop material, it is not the property of retentivity but the coupling properties of the material which is necessary. That is, the elements, the cores 10, 12 and 14 of FIG. 1, are employed to couple the input to the output and as the elements are heated, the amount of coupling is varied which is the measure of the temperature. Also, while the embodiment of FIG. 1 shows only three elements, a greater number of elements may be utilized, each made of material having a different transitional temperature for closer regulation over narrower temperature ranges.

While the invention has been particularly shown and described with reference to a preferred embodiment thereof, it will be understood by those skilled in the art that various changes in form and details may be made therein without departing from the spirit and scope of the invention.

What is claimed is:

1. A device for measuring temperature comprising input and output means, a plurality of flux paths made of magnetic material exhibiting a substantially rectangular hysteretic characteristic with each said path having a transition temperature at which the hysteretic characteristic thereof disappears coupling said input and output means, means energizing said input means for alternately switching said paths from one stable state to another stable state of residual flux density, said output means responsive to the energization of said input means to provide output signals which vary in accordance with the temperature variance of the material of said paths.

2. A circuit comprising a plurality of elements each made of material exhibiting a hysteresis characteristic with the different elements having different transition temperatures at which the hysteretic characteristic disappears, each said element capable of existing in either of two stable states when the material thereof is below its predetermined temperature, means for applying signals to said elements effective to switch the elements whose material is below its predetermined temperature between said stable states, and means for producing an output signal in response to the change in states of said elements which varies in accordance with the temperature variance of said elements.

3. A temperature sensitive circuit comprising a plurality of closed flux paths each made of magnetic material exhibiting a substantially rectangular hysteresis loop with the material of the different paths having a different Curie temperature, means for alternately switching said paths from one to another direction of magnetization, further means for sensing the total flux change of all said paths when switched, and means for translating said total flux change into an electrical impulse.

4. In a temperature responsive circuit, a plurality of bistable magnetic cores each made of material having a predetermined Curie temperature, the Curie temperature of the material of said plurality of cores differing for each respective core, an input and an output winding coupling all said cores, means energizing said input winding for alternately switching said cores from one stable state to another to induce an impulse on said output winding whose volt-time product is a measure of the temperature of said cores.

5. A temperature sensitive circuit comprising a plurality of magnetic cores each made of material capable of attaining different stable states of flux density with the material of the different cores having a different Curie temperature, means for alternately switching said cores from one to another of said stable states, further means for sensing the total flux change of all said cores when switched, and means for translating said total flux change into a signal defining the temperature of said cores.

6. A temperature sensitive circuit comprising, a plurality of toroidal magnetic cores each made of magnetic material capable of attaining different stable states of remanent flux density with the material of the different cores having a different Curie temperature, means including an input winding coupling all said cores for alternately switching said cores from one to another of said stable states, and means for sensing and integrating the total flux change of all said cores when switched.

7. A temperature sensitive circuit comprising a plurality of toroidal magnetic cores each made of material exhibiting a substantially rectangular hysteresis characteristic with the material of the different cores having a different Curie temperature, an input winding coupling said cores, an output winding coupling said cores, means for energizing said input winding with opposite polarity impulses to cause said cores to alternately switch from one to another direction of magnetization, said output winding adapted to sense the total flux change of all said cores when switched, which defines the temperature of said cores, and an integrating circuit connected to said output winding for translating the total flux change of said cores to a scaler quantity.

References Cited in the file of this patent

UNITED STATES PATENTS

| | | |
|---|---|---|
| 2,431,352 | Theillaumas | Nov. 25, 1947 |
| 2,825,868 | Olsen | Mar. 4, 1958 |
| 2,916,689 | Selin | Dec. 8, 1959 |
| 2,939,019 | Ridler et al. | May 31, 1960 |